（12）United States Patent
Collin et al.

(10) Patent No.: US 8,387,716 B2
(45) Date of Patent: Mar. 5, 2013

(54) JOINT DEVICE AT AN AGRICULTURAL MACHINE

(75) Inventors: Morgan Collin, Mjölby (SE); Johan Mattsson, Motala (SE)

(73) Assignee: Vaderstad-Verken Aktiebolag, Vaderstad (SE)

( * ) Notice: Subject to any disclaimer, the term of this patent is extended or adjusted under 35 U.S.C. 154(b) by 430 days.

(21) Appl. No.: 11/918,166

(22) PCT Filed: Apr. 7, 2006

(86) PCT No.: PCT/SE2006/050063
§ 371 (c)(1),
(2), (4) Date: Jan. 9, 2008

(87) PCT Pub. No.: WO2006/110101
PCT Pub. Date: Oct. 19, 2006

(65) Prior Publication Data
US 2008/0190630 A1    Aug. 14, 2008

(30) Foreign Application Priority Data
Apr. 11, 2005    (SE) ...................................... 0500805

(51) Int. Cl.
*A01B 23/04* (2006.01)
(52) U.S. Cl. ........................ 172/776; 172/481
(58) Field of Classification Search .................. 172/311, 172/481, 753, 776
See application file for complete search history.

(56) References Cited

U.S. PATENT DOCUMENTS

| 3,508,618 | A | | 4/1970 | Walberg |
| 4,064,947 | A | * | 12/1977 | Cole .............................. 172/781 |
| 4,137,852 | A | | 2/1979 | Pratt |
| 4,245,458 | A | * | 1/1981 | Smith ............................. 56/377 |
| 4,368,003 | A | * | 1/1983 | MacDonald .................. 414/523 |
| 4,579,179 | A | * | 4/1986 | Vachon ......................... 172/395 |
| 4,591,181 | A | * | 5/1986 | Gutschmidt ................ 280/476.1 |
| 4,790,389 | A | * | 12/1988 | Adee et al. ..................... 172/776 |
| 5,190,207 | A | * | 3/1993 | Peck et al. ..................... 228/170 |
| 5,231,829 | A | * | 8/1993 | Tonutti .......................... 56/377 |
| 6,016,877 | A | * | 1/2000 | Noonan et al. ................ 172/776 |
| 6,213,221 | B1 | * | 4/2001 | Lewallen ...................... 172/776 |
| 6,293,353 | B1 | * | 9/2001 | Poole ............................ 172/776 |
| 6,330,784 | B1 | | 12/2001 | Kutach, III et al. |
| 6,405,517 | B1 | * | 6/2002 | Peeters et al. .................. 56/377 |
| 6,732,812 | B1 | * | 5/2004 | Royer ........................... 172/462 |
| 6,865,873 | B2 | * | 3/2005 | Menichetti ...................... 56/367 |

FOREIGN PATENT DOCUMENTS

WO    WO 2004/109129 A1    12/2004

* cited by examiner

*Primary Examiner* — Thomas B Will
*Assistant Examiner* — Joel F. Mitchell
(74) *Attorney, Agent, or Firm* — Birch, Stewart, Kolasch & Birch, LLP

(57) ABSTRACT

A joint device of an agricultural machine has at least one tool-bearing beam (2*a-c*, 3*a-c*) for soil tillage tools (4, 5, 38, 39), such as seed coulters and cultivator tines, whereby a portion (10) of the beam end, at least on one side of the machine, is detachably fastened by means of a bolt/nut connection (13, 18, 23) arranged within the tool-bearing beam. A threaded body (18, 50) in the bolt/nut connection is fixed, preferably plug welded, in the main part of the beam (2*a-c*, 3*a-c*).

17 Claims, 8 Drawing Sheets

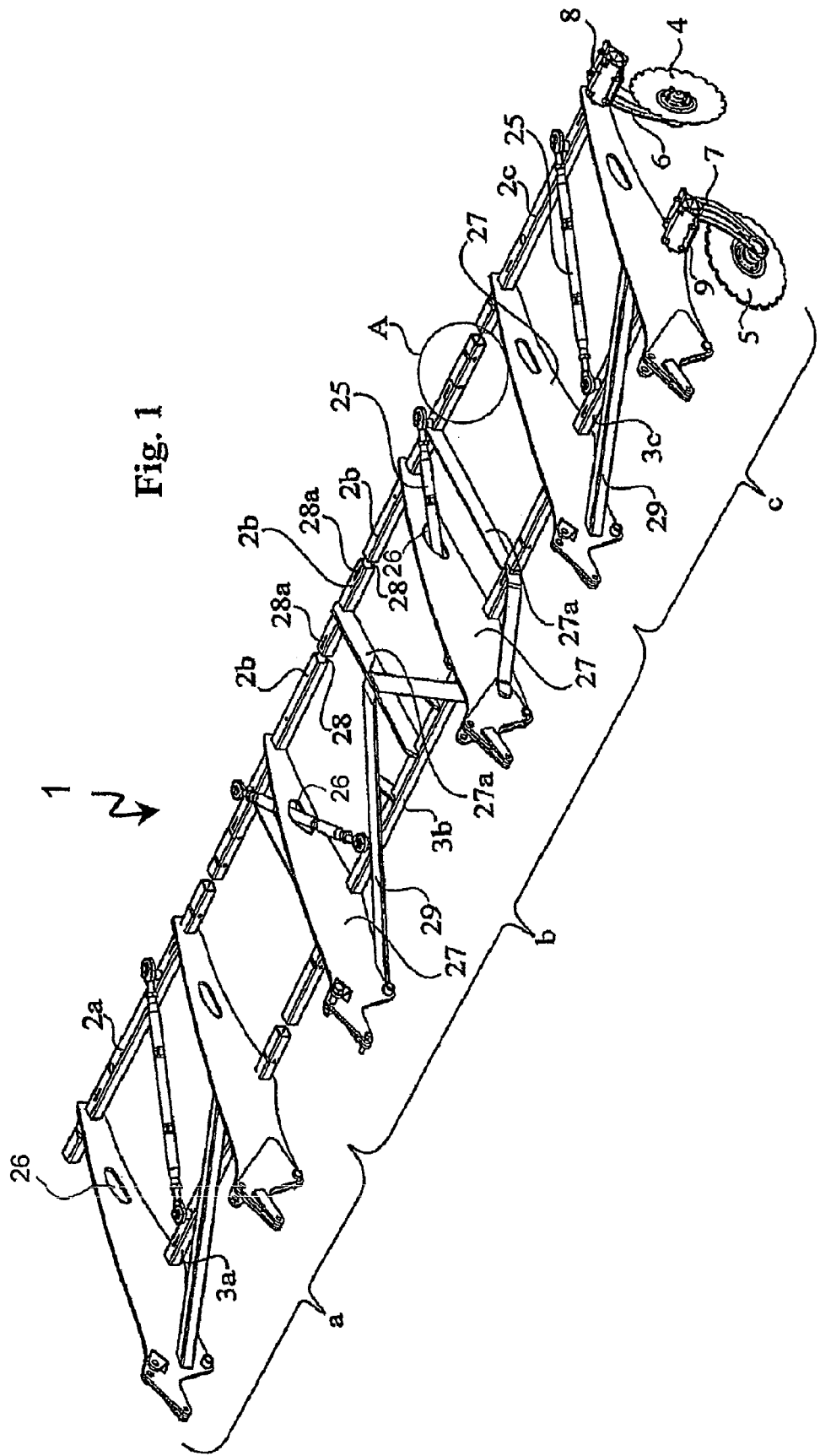

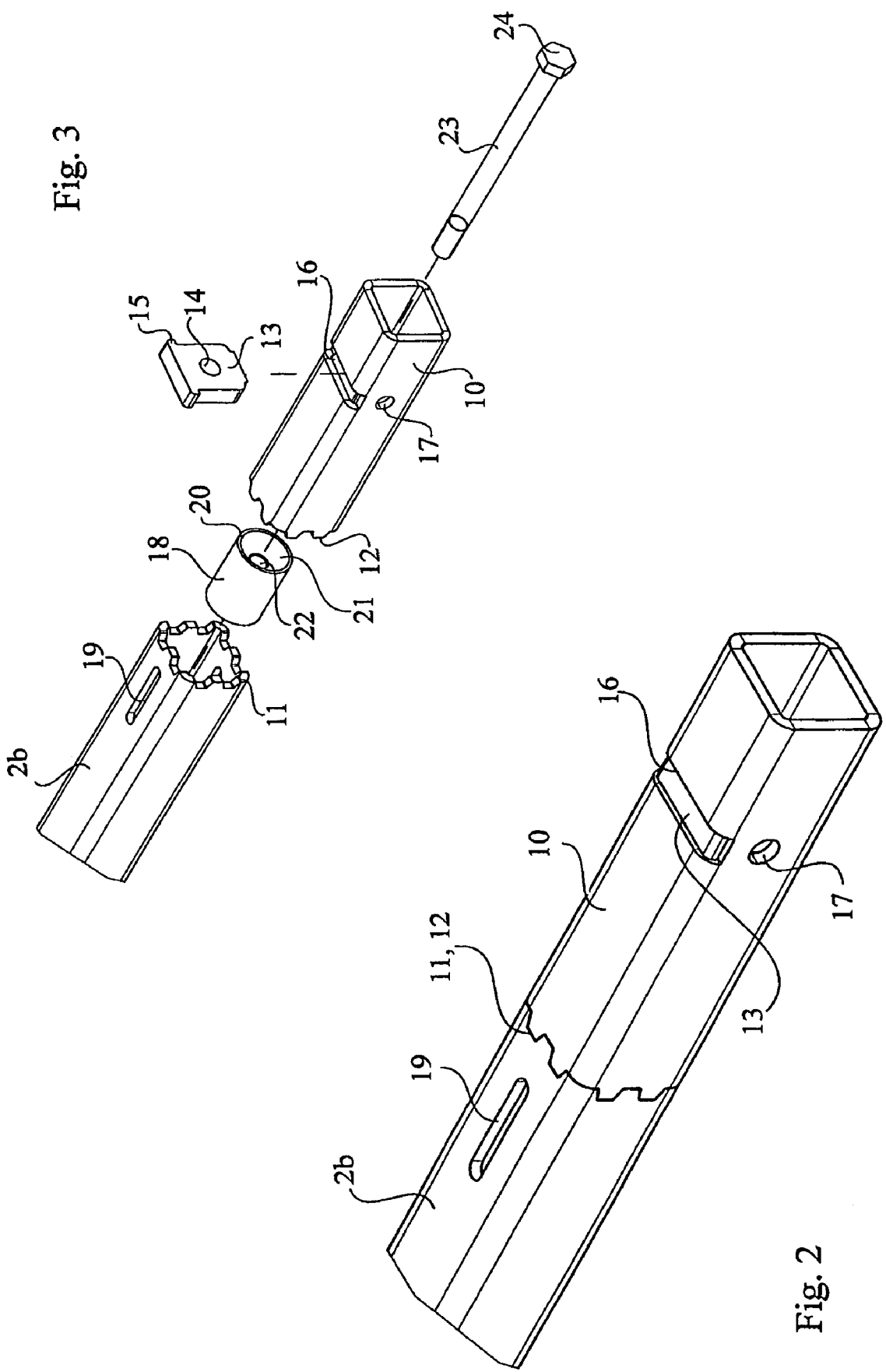

JOINT DEVICE AT AN AGRICULTURAL MACHINE

BACKGROUND OF THE INVENTION

1. Field of the Invention

The present invention relates to a joint device at an agricultural machine with at least one tool-bearing beam for soil tillage tools, such as discs, cultivator tines, or similar tools.

The large seed drills of today often have a width that exceeds the permitted width for vehicles on public roads. During transport of newly manufactured seed drills from the factory to the user or wholesaler, i.e. transport during delivery, one problem is that the seed drill is delivered in sections, which must then be finally assembled on site.

An aim of the present invention is to achieve a device of the initially defined type, with which transport of the agricultural implement on public roads is simplified and which thus brings a cost effectiveness and often represents a time saving during final assembly.

2. Summary of the Invention

The aim of the invention is achieved through the end portions of the tool-carrying beam being detachable and attachable by means of a bolt/nut connection arranged inside the beam and the end portion.

The present invention is especially suitable during transport of seed drills and cultivators where the machine can be finally assembled at the factory and the user only needs to assemble the end portions by tightening a bolt that is recessed in a hole in a counterstay anchored in the end portion of the tool-bearing beam, which bolt is inserted into and tightened in a threaded hole in a cylinder, which is anchored in the main part of said tool-bearing beam. The counterstay and cylinder are preferably welded fast in the beam parts.

The joint device between the end portion of the tool-bearing beam and the main part has a pattern so as to achieve a torsional resistance between the two parts. Furthermore, the joint device can be formed so that it can only be assembled in one way, which prevents incorrect assembly.

BRIEF DESCRIPTION OF THE DRAWINGS

The invention is described more closely in the following with reference to the drawings attached, which show preferred embodiments.

FIG. 1 is a partial perspective view from above of a tool-bearing frame at a soil tillage machine with a first embodiment of a joint device according to the invention.

FIG. 2 is an enlarged perspective view of the detail A shown with a circle in FIG. 1, which shows the joint device according to the invention.

FIG. 3 shows a partial exploded view in a perspective from above of the detail in FIG. 2.

DETAILED DESCRIPTION OF THE INVENTION

Figure 4:
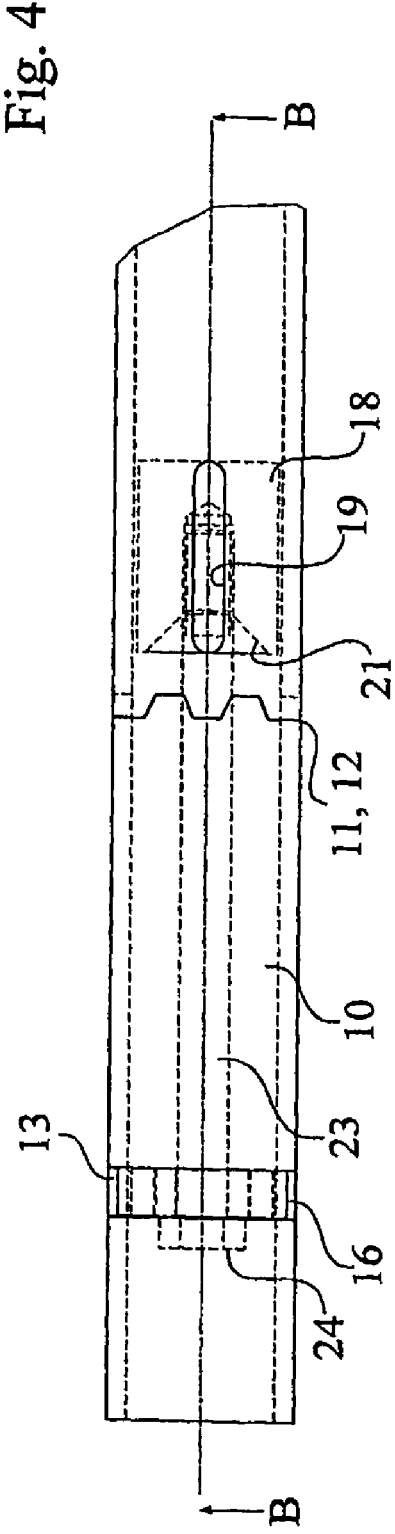
FIG. 4 shows a side view of the detail in FIG. 2.
Figure 5:
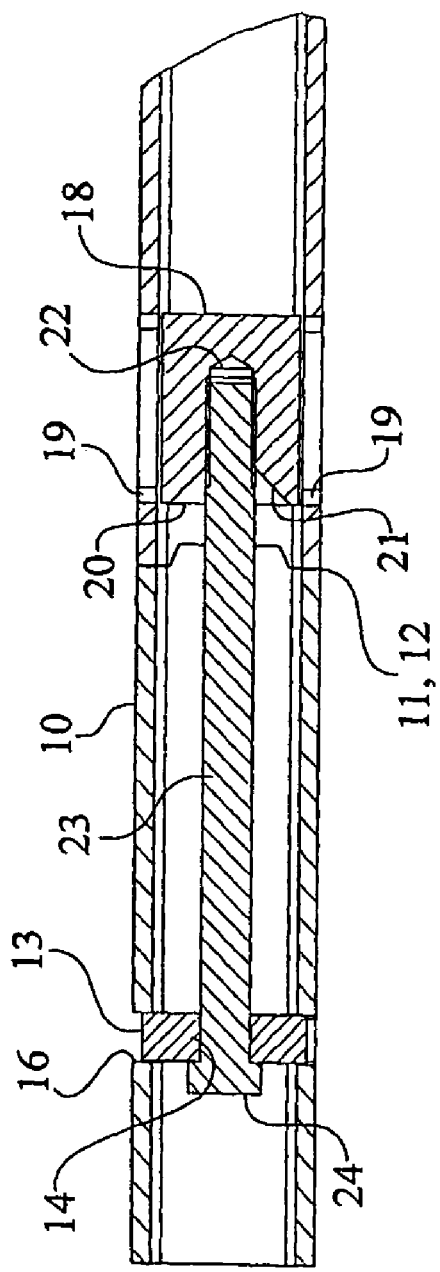
FIG. 5 shows a cross-section through the line B-B in FIG. 4 of the detail in FIG. 2.
Figure 6:
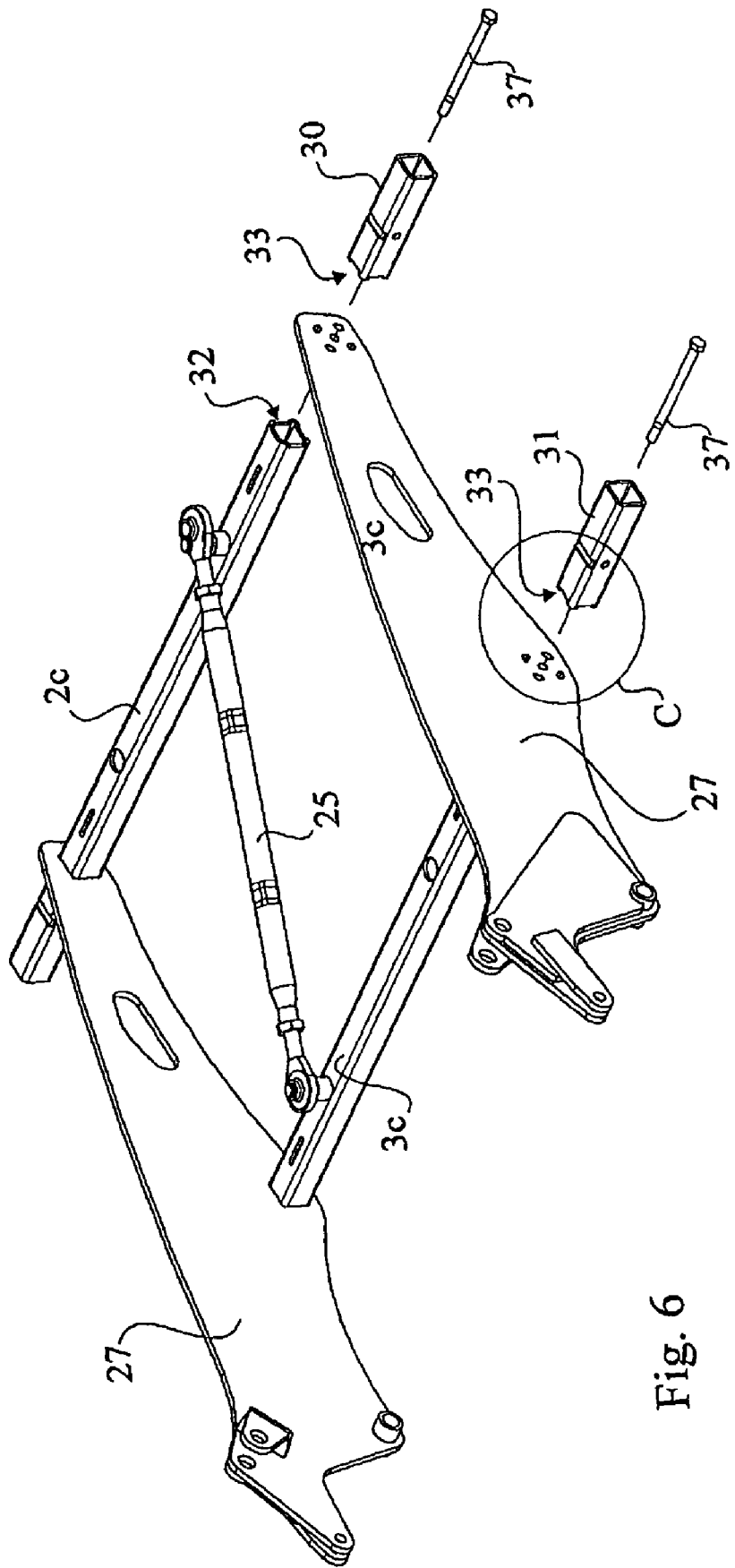
FIG. 6 partially shows a view similar to that in FIG. 1 of a part of the frame in FIG. 1, more specifically its outer end portion, whereby is illustrated a second embodiment of a joint device according to the invention.

Corresponding details in the embodiments described below and in the drawings have been given the same reference number.

FIGS. 1-5 show a first embodiment of a joint device according to the invention, where FIG. 1 shows a frame 1 with tool-bearing beams 2a, b, c and 3a, b, c for an agricultural machine, where the plurality of the details have been removed for the sake of clarity and where only two tools are shown, namely discs 4, 5, which are journalled in bearings on disc arms 6, 7, which at their upper end are mounted on the beams 2a, b, c and 3a, b, c by means of a rubber-sprung holding fixture 8, 9 through tightening of bolts in the holding fixtures 8, 9. Similar not shown discs are mounted at predetermined distances from each other along the beams. The frame 1 is divided into three sections a, b and c, of which b comprises a central section and a and c comprise side or wing sections. The wing sections are turnable by means of not shown hydraulic piston and cylinder aggregates upwards to a mainly vertical position for transport of the machine behind a not shown tractor on public roads.

Between the beams 2 and 3 are mounted brace plates, which are partially welded fast and partially mounted fast by means of the joint device according to the invention, which will be described more closely below.

To facilitate final assembly at the user the ends of the beams have been provided with detachable and re-attachable extension portions 10. The cross-sectional surfaces 11 and 12 between the beam 2b and the extension portion 10 have been given a special compatible form. FIGS. 2-5 show square wave-like cross-sectional surfaces 11 and 12. However the cross-sectional surfaces are not limited to this form but can be shaped according to preference, the main factor being that it provides a torsion resistant connection between the beam sections, when they are assembled. Furthermore, it is desirable that when the extension portions are assembled a uniform transition between all side surfaces of the beam is achieved.

An insert or counterstay 13, through which a circular fully penetrating hole 14 has been made, is fixed at a predetermined distance from the end of the extension portion 10 away from the main beam 2b. The counterstay 13 has the shape of a T and can be inserted down into a recess 16 in one side of the extension portion 10, as shown in FIG. 3. The upper part of the T forms shoulders 15, which are brought on each side to abut the walls of the extension portion in the recess 16. The counterstay is then plug welded fast in the recesses 17 on the other sides of the extension portion 10. In the beam 2b a cylinder 18 is fixed, preferably by means of plug welding in the recesses 19. One side 20 of the cylinder 18, which in the assembled position is facing the extension portion 10, is provided with a conical recess 21, in the center of which is a threaded hole 22. A bolt 23 is intended to be pushed into the hole 14 in the counterstay 13 and further into the threaded hole 22 in the cylinder 18. The aim of the conical recess is to guide the bolt into the threaded hole 22. The bolt 23 is then tightened so that the bolt, the head 24 of which abuts the counterstay 13, tightens the extension portion 10 firmly against the beam 2b. In this way a tighten and torsion resistant extension of the beam 2b is achieved. Other beams in the frame 1 also preferably have in the same way extendable outer ends. The extension portion can be made of different lengths to thereby form the basis for a system of agricultural machines of different lengths. Thus for different working widths different lengths of extension portions can be procured or can be included on delivery.

The tool-bearing beams in FIG. 1 are internally displaceable laterally by means of rigging screws 25, which extend through recesses 26 in the brace plates 27. Between the beams 2b and 3b on the central section is arranged a tie bar 27a, of which the outer ones as well as the brace plates 27 are bowed during lateral displacement by means of the rigging screws 25. The fore beam 2b of the central section is divided into three parts with guides 28 in the form of cylindrical rods, preferably round in section, which are inserted into two neighbouring beams and plug welded in one beam at 28a. These measures have been adopted to allow two neighbouring beams to be fixed in different positions so as to thereby set the relative distance between the discs on the fore beams 2a, b, c and 3a, b and c respectively. During tightening or displacement of the rigging screws 25 the brace plates 27 give way and the beams are fixed in a new position. Diagonal bars 29 are arranged welded fast between the brace plates 27 on the wing sections a and c for stability purposes.

Figure 7:
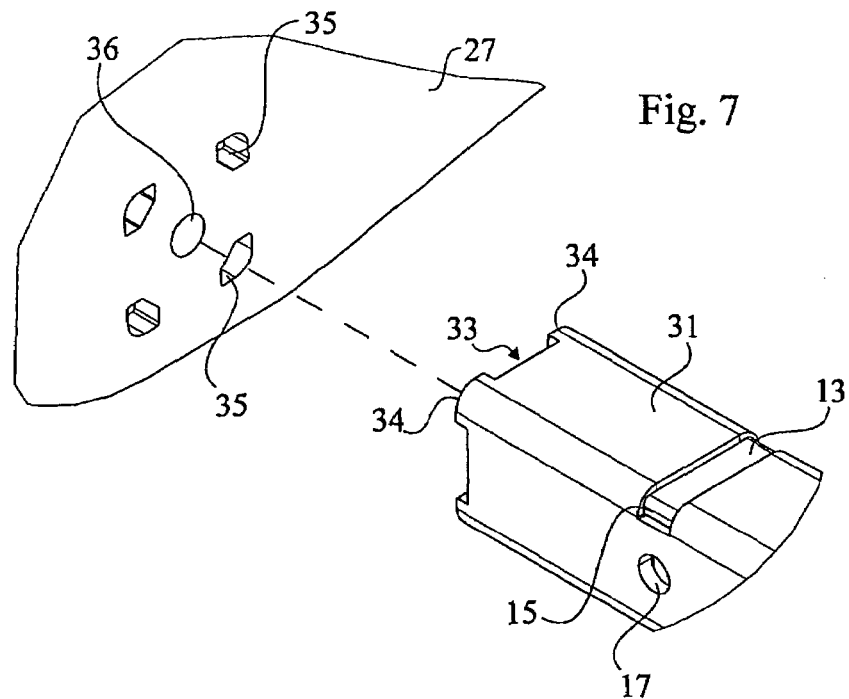
FIG. 7 shows an enlarged perspective view of the detail C shown with a circle in FIG. 6, which shows the joint device according to the invention.
Figure 8:
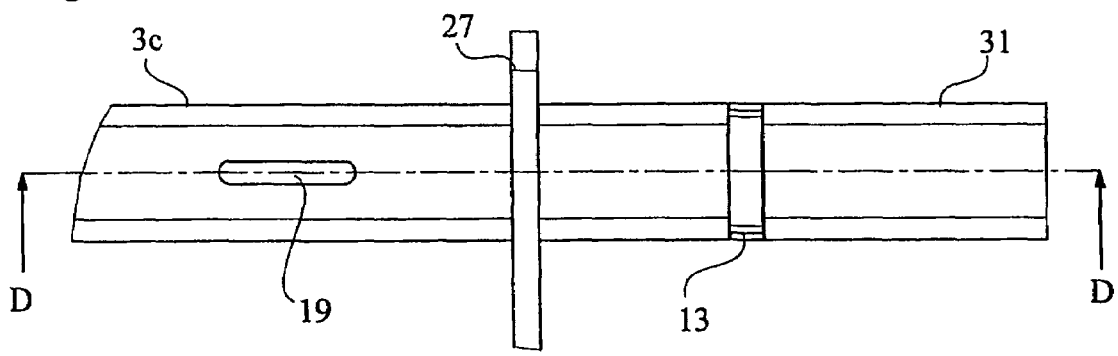
FIG. 8 shows a side view of the detail in FIG. 7.
Figure 9:
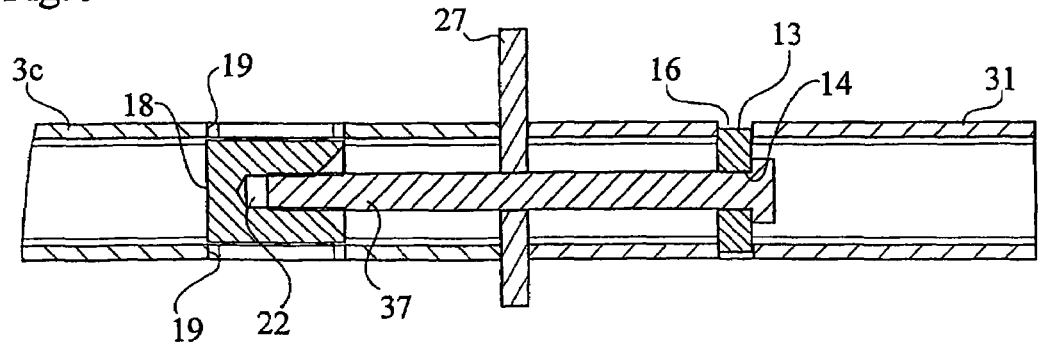
FIG. 9 shows a cross-section through the line D-D in FIG. 8 of the detail in FIG. 7.

FIGS. 6-9 show a second embodiment of the joint device according to the invention arranged at the outermost end of the right wing section c in FIG. 1. Here the illustration shows how a brace plate can be fixed at the beam between the main beam parts 2c and 3c and the corresponding extension portions 30 and 31 respectively. It is recognised that this described below can also be applied on the beams on the left wing section a. The end portions of the main beam parts 2c, 3c are referred to with reference number 32 and the corresponding end portions of the extension portions 30 and 31 are referred to with reference number 33. The extension portion 31, which is shown in FIG. 7, has on one cross-sectional surface, which is facing the main beam part 3c, an end contour in the form of a protrusion 34 at each corner of the square profile of the beam. In the brace plate 27 there are four holes 35 positioned to correspond to each corner protrusion 34 so that they essentially together form the corners of an imaginary square and are intended to thus arranged receive the four protrusions 34 of the extension portion. In the middle of the imaginary square with the mentioned holes 35 is a fully penetrating hole 36. The corresponding end of the beam 3c is similarly provided with four protrusions (not shown in FIG. 6, but as shown for the main beam part 2c), which also can be inserted into the holes 35 in the brace plate 29 but on its opposite side. A bolt 37 is introduced through a hole in the counterstay 13, further through the hole 36 made in the brace plate 27 and is thereafter screwed into the threaded hole 22 in the cylinder 18.

Figure 10:
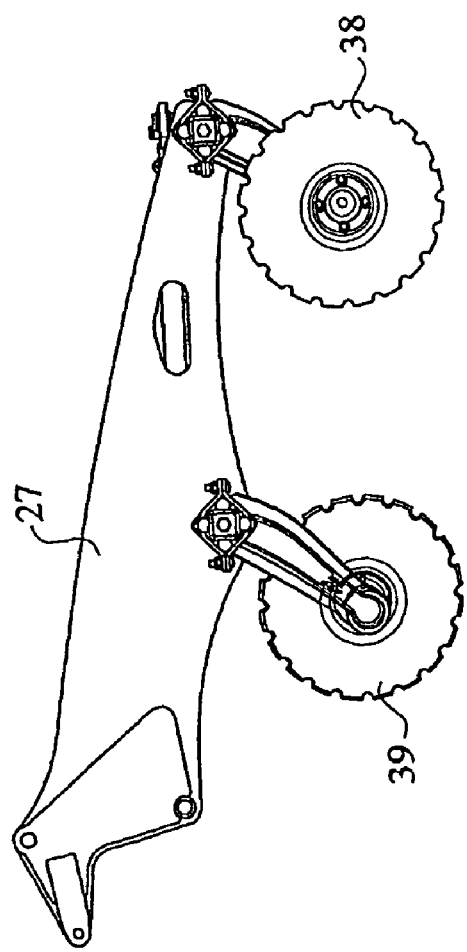
FIG. 10 shows a side view of the right wing section c in FIG. 6 with the two outer discs visible.
Figure 11:
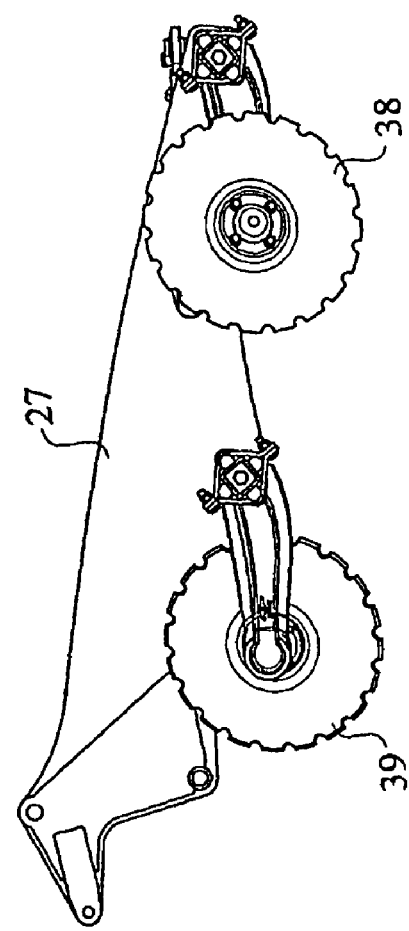
FIG. 11 shows a side view of the right wing section c in FIG. 6 and reveals how the tools can be displaced inwards so as not to exceed the permitted width.

FIGS. 10 and 11 show how the tools, in this case discs 38, 39 on the wing sections a and c, can be turned towards the beams and fixed in this position during driving on public roads so as not to exceed the permitted width. First the rigging screws and other objects (not the brace plates) that can impede a rotation of the beams around their axles are loosened. The bolts 37 are thereafter loosened somewhat so that all the protrusions 34 come free from the holes 35. The beams are then rotated approx. 45° and the bolts are tightened again to clamp the beams fast against the brace plates.

FIGS. 12-15 show a third embodiment of the joint device according to the invention. Here is shown a frame with two tool-bearing rows of fore beams 40a, b, c and rear beams 41a, b, c arranged on a central section 42 and side or wing sections 43. Extension sections 44 and 45 are detachably mounted by means of a bolt/nut connection consisting of, at each joint and extending from the inner corners of the beam, four threaded rods 46, which are inserted through plug welded hole-provided end bars 47 and plug welded, with fully penetrating hole-provided guides 48 and then screwed into corresponding threaded holes 49, which are made in plug welded inserts 50 in the main beam parts of the sections. Nuts 51 with washers 51a are tightened at the outer ends of the threaded rods towards the end portions of the end bar 47 that function as a counterstay.

Figure 12:
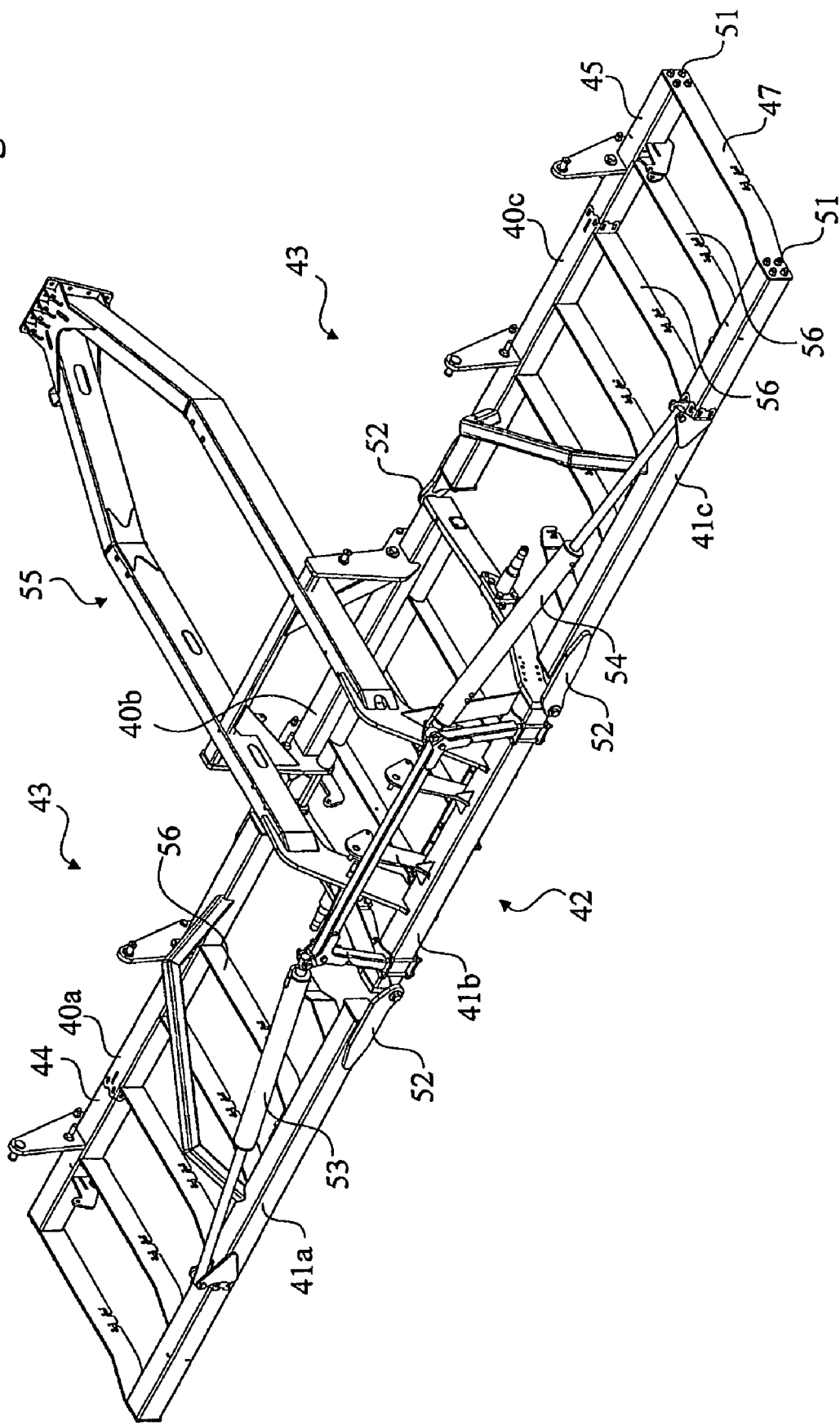
FIG. 12 is a partial perspective view from above of a tool-bearing frame in a soil tillage machine with a third embodiment of a joint device according to the invention.
Figure 13:
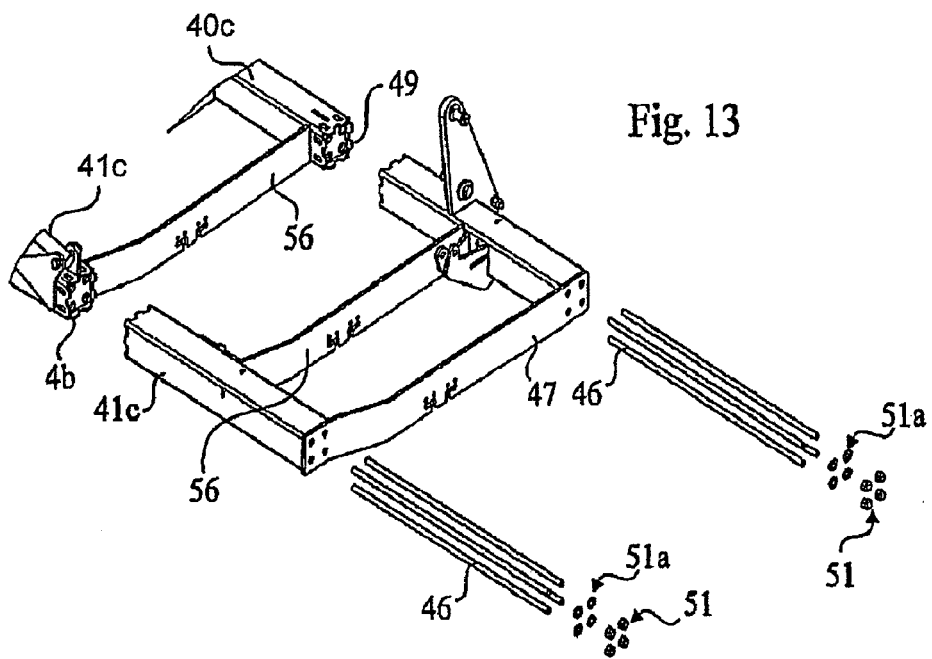
FIG. 13 is a partial exploded view in perspective of an end portion of the frame in FIG. 12, which shows the joint device according to the invention.
Figure 14:
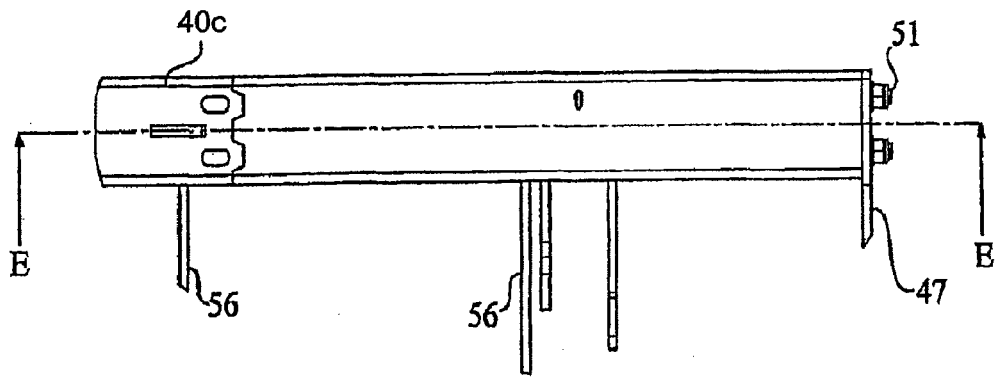
FIG. 14 shows a partial view from above of the fore part of the end portion in FIG. 13.
Figure 15:
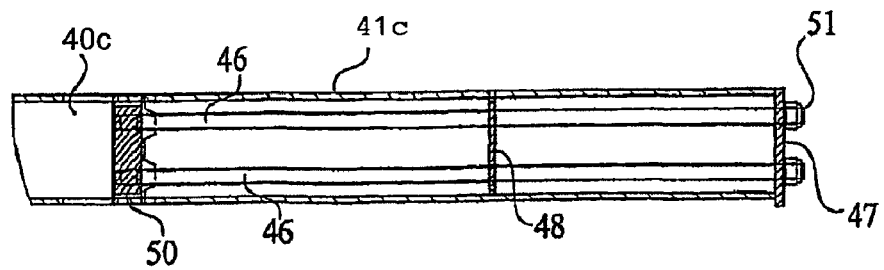
FIG. 15 shows a cross-section through the line E-E in FIG. 14.

FIG. 12 shows joints 52 between the central section 42 and the wing sections 43 and parts of the hydraulic device 53, 54, which is required to lift the wing sections from the working position shown to a transport position, in which they are primarily vertical. A towbar 55 for coupling to a tractor or similar draught vehicle is also shown. Parallel to the end bar 47 additional stabiliser bars 56 are fastened between the fore and rear beams 40a, b, c and 41a, b, c. In FIG. 12 too, tools and other details have been omitted for the sake of clarity.

It should be pointed out that the abovementioned cylinders 18 in the different embodiments can be as shown circular cylindrical, but can also be created in another suitable form. They can also have a form that fixes them rotation resistantly in the holes in the main beam, such as mainly square cylindrical.

The joint device according to the invention can naturally be modified further within the framework of the attached claims.

The invention claimed is:

1. A joint device for an agricultural machine, comprising:
a central section including a first beam extending in a direction perpendicular to a traveling direction of the agricultural machine;
at least one side section extending the agricultural machine in a lateral direction beyond the central section, the side section having a second beam for supporting soil tillage tools, one end of the second beam opposing an end of the first beam;
an extension portion disposed between the opposing ends of the first beam and the second beam, said extension portion having a predetermined length and extending laterally the width of the central section, said extension portion extending in the direction perpendicular to the traveling direction of the machine,
said side section being selectively positioned in a first position, in which one end of said second beam is opposed to an end of said first beam and to said extension portion and said side section extends laterally, and in a second position turned upwardly to reduce the lateral dimension of the machine for transport, and
the extension portion being detachably fastened to the first beam, whereby said extension portion can be removed from said first beam while said side section is in said second position to reduce the lateral dimension of the machine,
wherein an end surface of the first beam and an end surface of the extension portion that opposes the end surface of the first beam are provided with a mutually compatible form and are selectively moved into contact with each other, such that when the end surface of the extension portion engages the end surface of the extension portion, a uniform transition between the first beam and the extension portion is achieved.

2. The joint device according to claim 1, wherein the soil tillage tools include seed coulters.

3. The joint device according to claim 1, wherein the soil tillage tools include cultivator tines.

4. The joint device according to claim 1, wherein the end surface of the extension portion and the opposing end surface of the first beam are butt joined.

5. The joint device according to claim 1, wherein the extension portion is fastened to the first beam by means of a nut and bolt connection arranged within the extension portion.

6. A joint device for an agricultural machine, comprising:
 a central section including a first beam extending in a direction perpendicular to a traveling direction of the agricultural machine;
 at least one side section extending the agricultural machine in a lateral direction beyond the central section, the side section having a second beam for supporting soil tillage tools, one end of the second beam opposing an end of the first beam;
 an extension portion disposed between the opposing ends of the first beam and the second beam, said extension portion having a predetermined length and extending laterally the width of the central section, said extension portion extending in the direction perpendicular to the traveling direction of the machine;
 said side section being selectively positioned in a first position, in which one end of said second beam is opposed to an end of said first beam and to said extension portion and said side section extends laterally, and in a second position turned upwardly to reduce the lateral dimension of the machine for transport;
 a body provided with at least one threaded hole fixed the first beam;
 a counterstay provided with at least one fully penetrating hole and fixed inside the extension portion; and
 a bolt adapted to be inserted through the hole in the counterstay and into the threaded hole in the body, such that the bolt is screwed in to draw together and detachably fasten the extension portion against the first beam, whereby said extension portion can be removed from said first beam while said side section is in said second position to reduce the lateral dimension of the machine,
 wherein an end surface of the first beam and an end surface of the extension portion that opposes the end surface of the first beam are provided with a mutually compatible form and are selectively moved into contact with each other, such that when the end surface of the extension portion engages the end surface of the extension portion, a uniform transition between the first beam and the extension portion is achieved.

7. The joint device according to claim 6, wherein a side of the body facing the counterstay has a conical recess to facilitate attachment of the bolt.

8. The joint device according to claim 6, wherein the body is plug welded in the first beam, and the counterstay is plug welded in the extension portion.

9. The joint device according to claim 6, further comprising:
 a guide having at least one fully penetrating hole being provided between the body and the counterstay.

10. The joint device according to claim 9, wherein the guide is a plug welded in said at least one of the first beam and the extension portion.

11. The joint device according to claim 6, wherein said mutually compatible form has an irregular shape to allow an assembly only in one way, such that the extension portion is assembled in a right way with respect to the first beam.

12. The joint device according to claim 6, wherein the soil tillage tools include seed coulters.

13. The joint device according to claim 6, wherein the soil tillage tools include cultivator tines.

14. The joint device according to claim 6, wherein the end surface of the extension portion and the opposing end surface of the first beam are butt joined.

15. The joint device according to claim 1, wherein a cross-sectional area of the extension portion being the same as a cross-sectional area of the first beam.

16. The joint device according to claim 15, wherein said mutually compatible form has an irregular shape to allow an assembly only in one way, such that the extension portion is assembled in a right way with respect to the first beam.

17. A joint device for an agricultural machine, comprising:
 a central section including a first beam extending in a direction perpendicular to a travelling direction of the agricultural machine;
 a side section extending the agricultural machine in a lateral direction beyond the central section, the side section having a second beam for supporting soil tillage tools, one end of the second beam opposing an end of the first beam;
 an extension portion disposed between the end of the first beam and the one end of the second beam, said extension portion having a first end that opposes the end of the first beam and a second end, opposite to the first end, that opposes the one end of the second beam, said extension portion having a predetermined length and extending concentrically with the first beam in the direction perpendicular to the travelling direction to extend a width of the central section,
 said side section being selectively positioned in a first position, in which the one end said second beam is opposed to the second end of the extension portion and the second beam extends concentrically with the extension portion, such that the side section extends in the direction perpendicular to the travelling direction from the second end of the extension portion, and in a second position, in which the side section is turned upwardly to reduce the lateral dimension of the machine for transport, and
 the extension portion being detachably fastened to the first beam, whereby said extension portion can be removed from said first beam while said side section is in said second position to reduce the lateral dimension of the machine.

* * * * *